Dec. 27, 1966     D. BORST ETAL     3,294,507
TRANSVERSE HEAT ABSORPTION FROM A DRAWN GLASS
SHEET SUBSEQUENT TO ROLL FORMING
Filed March 13, 1963     4 Sheets-Sheet 1
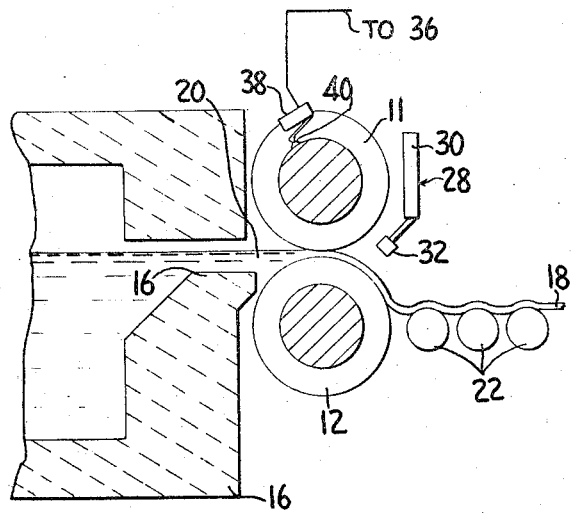
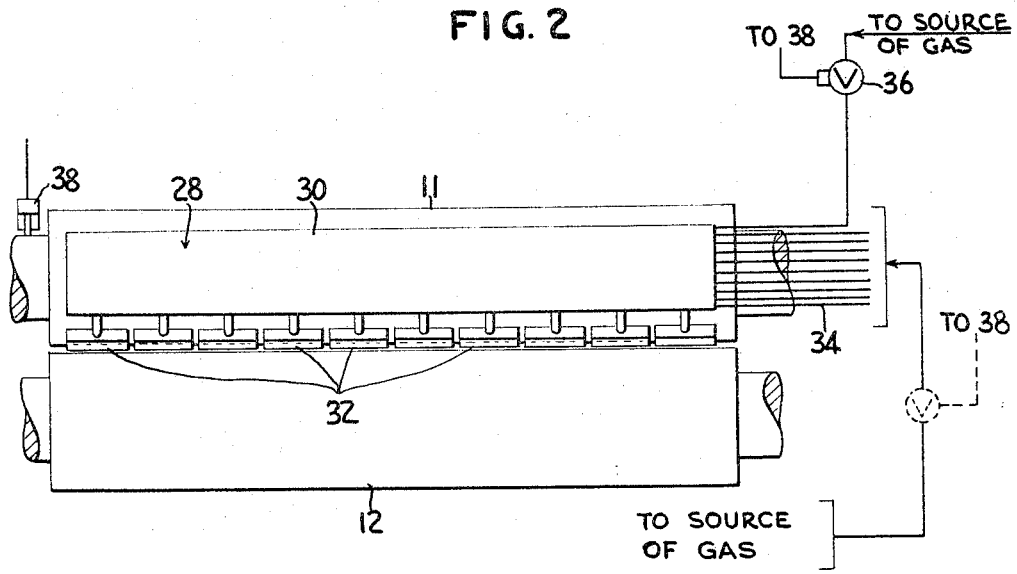
INVENTORS
DEAN BORST and
FRANCIS X. MITTEREDER
BY
*Oscar L. Spencer*
ATTORNEY

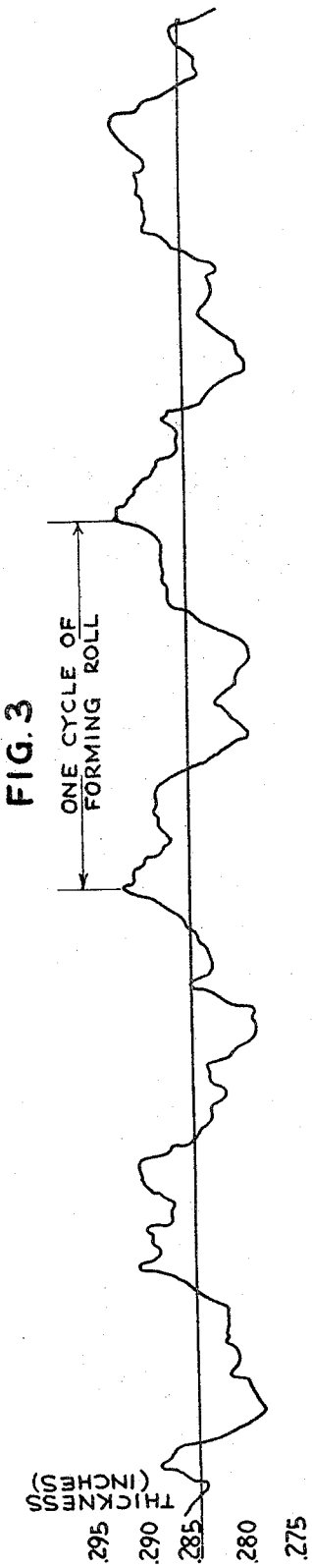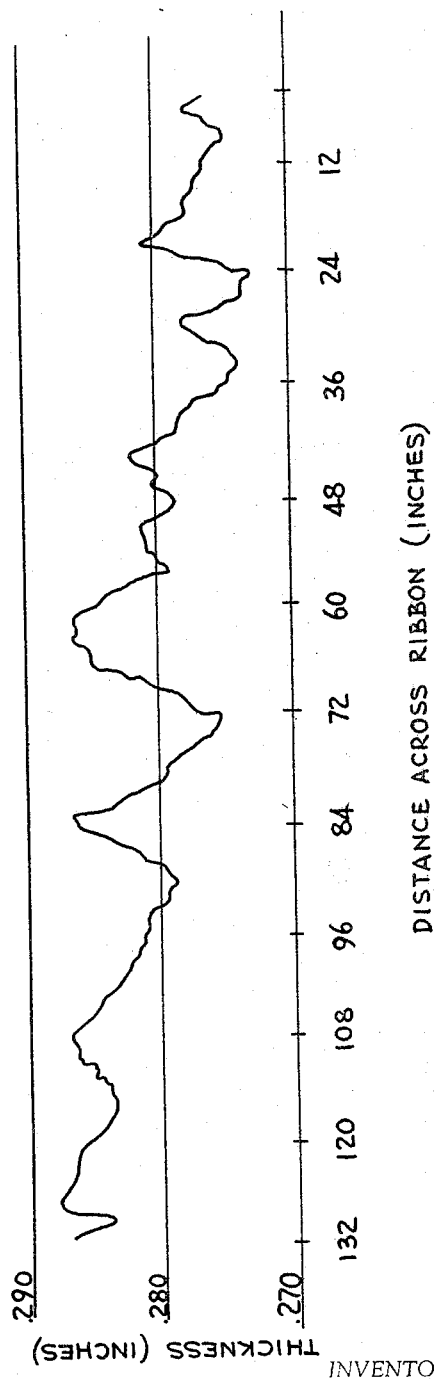

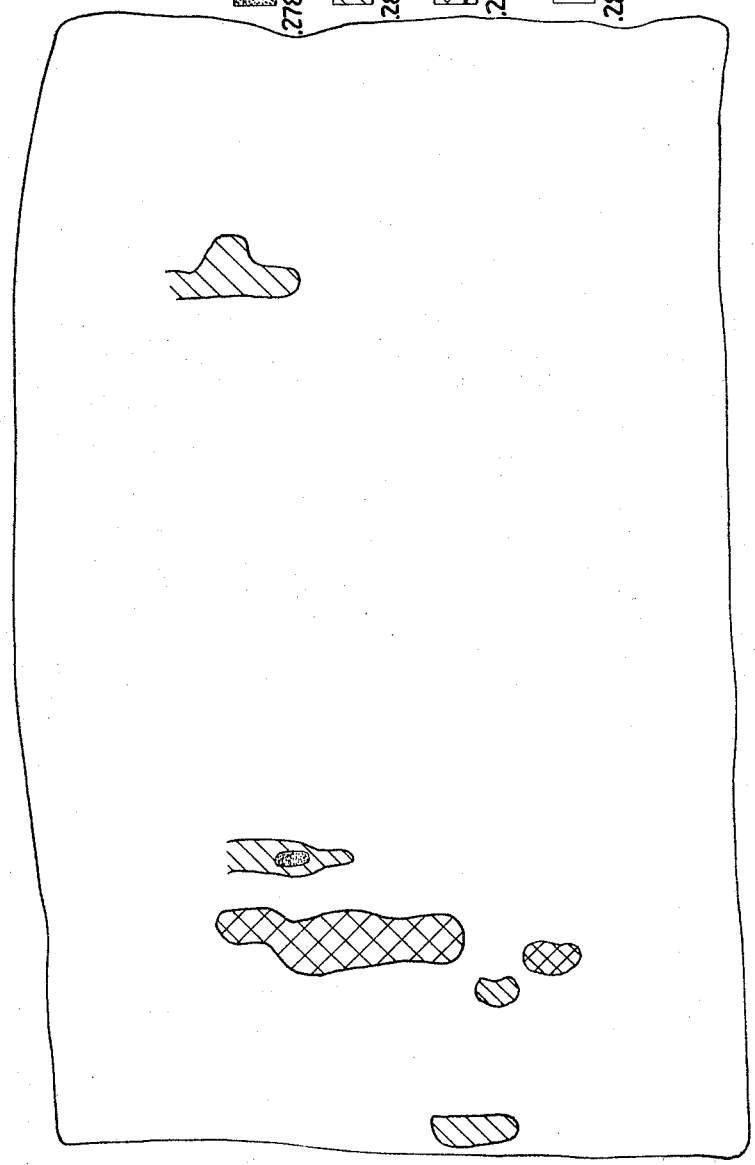

3,294,507
TRANSVERSE HEAT ABSORPTION FROM A DRAWN GLASS SHEET SUBSEQUENT TO ROLL FORMING
Dean Borst, Monroeville, and Francis X. Mittereder, Lower Burrell, Pa., assignors to Pittsburgh Plate Glass Company, Pittsburgh, Pa., a corporation of Pennsylvania
Filed Mar. 13, 1963, Ser. No. 264,802
3 Claims. (Cl. 65—29)

This invention relates to the production of flat glass formed by being rolled into a ribbon. Such glass may subsequently be ground and polished, either as a continuous ribbon of indeterminate length or as discrete sheets of determinate length. More specifically, this invention relates to a method and apparatus for controlling the thickness of the rolled glass or, expressed somewhat differently, controlling the thickness variations in the rolled glass.

In the process of manufacturing plate glass, molten glass is passed between a pair of cooled forming rolls which size the glass to rough width and thickness dimensions. This intermediate glass product, known as rough rolled glass, is annealed to remove or reduce stress and strain and is then ground and polished to final thickness and finish. The grinding and polishing steps may both be performed on the uncut ribbon, or the uncut ribbon may be ground and then cut into discrete sheets for polishing, or the ribbon may be cut into discrete sheets for grinding and polishing. In any event, the cost of removing glass by reducing the thickness of the rough rolled ribbon during the surfacing operations is both costly and time consuming.

By proceeding according to this invention, economies in the manufacture of plate glass or any rolled glass can be achieved. These economies emanate from the substantial elimination of thickness variations in the rough rolled ribbon which reduce the time required for grinding and polishing the ribbon to final thickness and finish because the final thickness is determined by the minimum thickness of the rough rolled glass and a reduction in thickness variation means less deviation from a minimum thickness. Thus, less glass removal is required. Thus, the cost of finishing such rough rolled glass is reduced.

A study of the glass rolling process has shown that glass forming rolls become eccentric, so as to periodically produce a thickness variation in the glass ribbon. The period of this variation will always be nearly equal to the circumference of the forming rolls.

We have found that it is possible to reduce the thickness variation caused by roll eccentricity by periodically changing the temperature distribution across the ribbon of glass in a region of ribbon stretch or, stated somewhat differently, modifying the viscosity profile of the rough rolled glass ribbon in a region of ribbon stretch in such a manner that thickness variations caused by forming rolls are materially reduced. The region of ribbon stretch is a region extending approximately 12 to 18 inches from the forming rolls and generally between the forming roll and the first apron roll. It may occur later as, for example, between the forming rolls and the second and third apron rolls. The periodic change in temperature distribution across the ribbon may be accomplished by differentially chilling the glass between the forming rolls and the first apron roll as by discharging air or other gaseous fluid onto the predetermined areas of the ribbon at a location between the forming rolls and the first and adjacent roll of the slip table arrangement. Automatic temperature distribituon change is accomplished by co-ordinating the gaseous discharge with the cycle of the forming rolls.

To accomplish the reduction of thickness variations, the gaseous discharge is at a temperature lower than the glass and is such to raise or increase the viscosity of the glass at the location of discharge. An increase in viscosity reduces the attenuation of the glass in the area onto which the gases are discharged and produces ultimate thickness of that mass of glass greater than that produced in the absence of such gas discharge.

The timing of the discharge can be determined by measurement of the transverse ribbon thickness in relation to the rotation of the forming rolls. The quantity of gas discharged is a function of time and is directly related to the amplitude of the variation and the length of the predetermined area of glass measured in the direction of movement of the ribbon.

The predetermined areas onto which the gas is discharged are preferably the thinner areas of the glass. By reducing the attenuation or stretch of the glass in these areas, a more uniform thickness ribbon is produced.

To further understand the invention, attention is directed to the accompanying drawings in which FIG. 1 is an elevation of apparatus for producing flat glass in accordance with this invention;

FIG. 2 is a view of forming rolls and gaseous discharge means for temperature distribution change;

FIG. 3 is a representation of a glass ribbon surface profile taken along the direction of ribbon formation indicating glass ribbon thicknesses and a forming roll cycle;

FIG. 4 is a representation of a glass ribbon surface profile taken across the ribbon transverse to that of FIG. 3 also indicating glass ribbon thickness;

FIG. 6 is a topographical mapping of a sample of glass made under the same conditions as that of FIG. 5 with the addition of the gaseous pulsing arrangement described herein and indicating with legends the various thicknesses of the glass.

Figure 5:
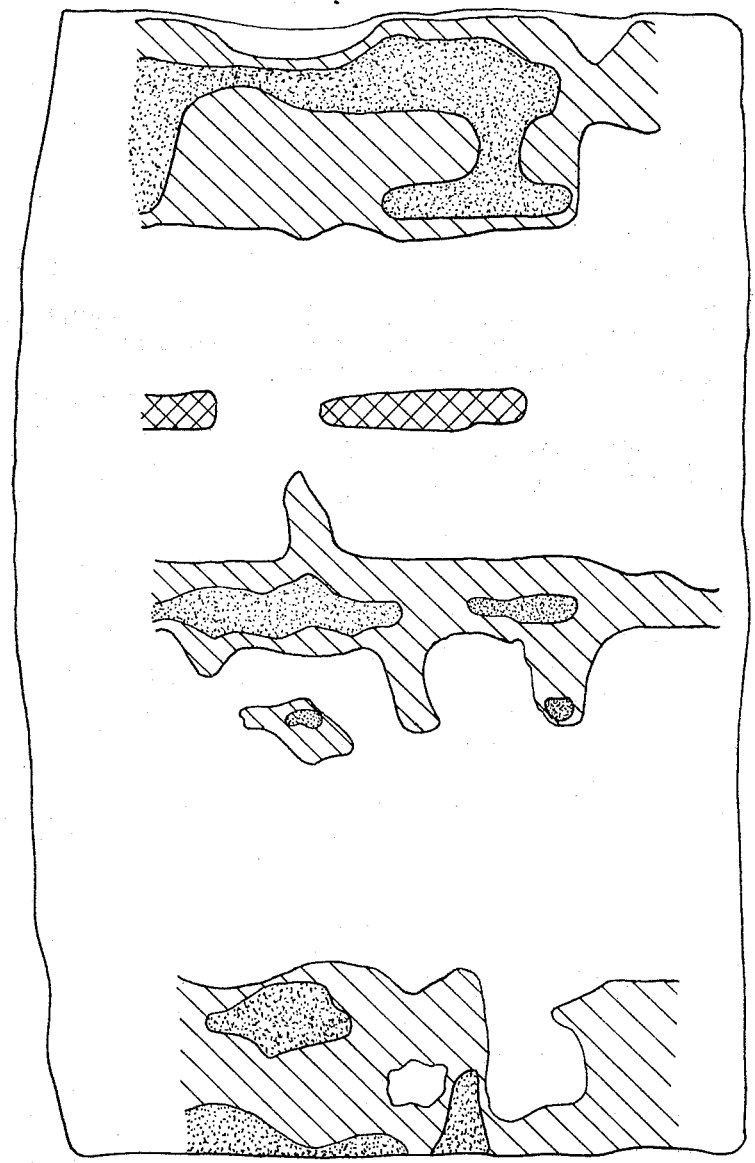
FIG. 5 is a topographical mapping of a sample of glass as normally produced by rolling indicating, with legends, various thicknesses of the glass.

Referring now to the drawings, and especially FIGS. 1 and 2, there is depicted a pair of forming rolls 11 and 12 mounted adjacent the lip 14 of a glass melting tank 16 (only a portion of which is indicated by broken lines). The rolls are rotatably driven by a driving mechanism (of conventional construction and thus not shown) and are separated a predetermined distance apart corresponding to the desired thickness of a rough rolled ribbon of glass 18 formed by a mass of molten glass 20 flowing over the lip 14 of the tank 16 into the bite between the rolls 11 and 12. The ribbon of glass 18 is discharged after forming onto an apron, shown here as including a plurality of driven rolls 22 which then deliver the ribbon into an annealing lehr (not shown). The ribbon 18 is conveyed through the lehr by a plurality of driven rolls and then generally to surfacing equipment for subsequent treatment.

Mounted adjacent the upper forming roll 11 is a gas discharge means, generally identified as 28 which includes a supporting member 30, preferably water cooled, and a plurality of gas discharge nozzles 32 arranged in tandem fashion with respect to one another and transverse to the ribbon of glass. Each nozzle 32 is connected individually, by means of ducting 34 passing through the supporting member 30 to a source of gas. A valve 36 is included within each gas line, so as to control the quantity and timing of gas discharge from a nozzle. Solenoid valves are preferably used.

In order to operate the solenoid valves, a limit switch 38 controlled by the rotation of the upper forming roll 11 is used. For this purpose an actuator 40 is adjustably mounted on the shaft of the roll 11 so as to periodically contact the limit switch 38 which in turn actuates one or more of the solenoid valves 36. Selection of the solenoid valves 36 which are operable depends upon the particular ribbon condition as respect to thickness variation at the time. By such selection, any particular nozzle or nozzles may be operable.

To select the pulsing pattern across the sheet, measurements of sheet thicknesses are made. Generally, the same variation will occur with the same rolls and the same desired thickness. Other conditions are generally encountered when at least one of these variables is changed. One frequent change is product thickness because plate glass is usually manufactured in a number of different thicknesses with the same pair of forming rolls and it is not certain that the same thickness variations will exist for any thickness produced. Also, at certain intervals, the rolls themselves are changed. The thickness variations are not the same for all pairs of rolls.

A typical thickness profile along the ribbon in the direction of the draw is shown in FIG. 3. A cycle of the forming rolls is indicated and it can be seen that the general profile is repetitive for each cycle of the rolls.

A typical thickness profile transverse to the direction of formation is shown in FIG. 4. Note that the variation from a mean thickness is not uniform from edge to edge of the ribbon. One reason for this is that the temperature conditions at the forming rolls may not be uniform from side to side thereof. There may also be differences in glass flows over the lip which can cause non-uniform thicknesses transverse to the flow of glass.

FIGS. 5 and 6 graphically show the improved results in ribbon thickness uniformity obtainable by using the described invention. The actual samples of glass graphically depicted were produced by the same forming rolls under similar conditions except that the FIG. 5 sample was made without the use of this invention while the FIG. 6 sample was made using this invention.

FIG. 5 shows a representation of a typical sample of glass with a desired control thickness being indicated by the absence of hatching. Variations from this control thickness are indicated by hatching according to the legends. Note that the actual thicknesses may be greater or less than the control thickness. FIG. 6 is a similar representation showing the results of this invention. The legends are the same as for FIG. 5.

The FIG. 5 sample map indicates that approximately 40 percent of the depicted glass areas has thicknesses differing from the control thickness. The FIG. 6 sample map indicates that approximately 2 percent of the depicted glass area has thicknesses differing from the control area. Thus, comparison of FIGS. 5 and 6 graphically shows a major improvement in uniformity of the glass produced when employing the present invention.

Generally the gas, usually air because of its availability, is blown against the thinner areas of glass to increase the viscosity and reduce the attenuation of that portion of the ribbon by the tractive force applied thereto by the apron rolls and the lehr rolls. The air generally will be directed at various locations across the ribbon. This can be readily understood when the profiles of FIGS. 3 and 4 are considered. Thus, to determine the air pulsing pattern, it is necessary to measure the ribbon thickness and determine its relation to the forming rolls. The switch actuator, limit switch and proper solenoid valves may then be coordinated to produce the desired results.

It will be readily understood that the temperature distribution modification may be accomplished in other ways, as for example by using adjustable positioned water coolers over the ribbon, and within the scope of the appended claims.

What is claimed is:

1. In a method for forming a ribbon of glass from a molten bath by preshaping viscous glass to a control thickness by passing the glass between a pair of forming rolls set at a spacing equal to said control thickness to form a ribbon of workable glass having at least one region wherein the thickness of the glass in the region is less than the control thickness, the improvement which comprises:
   determining the transverse location of each region wherein the thickness of said ribbon is less than the control thickness of said ribbon,
   withdrawing heat from each said region transversely of said ribbon at a location subsequent to the forming rolls until the viscosity of the glass in each said region is increased until, upon attenuation, the thickness in each said region is substantially the same as said control thickness, and
   thereafter attenuating said ribbon of glass to produce a ribbon having substantially uniform thickness.

2. The method of claim 1 wherein a stream of cool gas is applied to each said transversely disposed region at said location subsequent to said forming rolls.

3. The method of claim 1 wherein the radiant heat from each said transversely disposed region is absorbed at said location subsequent to said forming rolls to withdraw heat from said region and conducting said absorbed radiant heat away from each said transversely disposed region.

References Cited by the Examiner

UNITED STATES PATENTS

| 798,643 | 9/1905 | Wadsworth | 65—93 |
| 2,382,379 | 8/1945 | Boudin | 65—186 |
| 3,107,196 | 10/1963 | Acloque | 65—115 X |

FOREIGN PATENTS

| 535,284 | 1/1957 | Canada. |
| 637,278 | 2/1962 | Canada. |

DONALL H. SYLVESTER, *Primary Examiner.*

F. W. MIGA, *Assistant Examiner.*